(12) United States Patent
Callahan et al.

(10) Patent No.: US 10,479,339 B2
(45) Date of Patent: Nov. 19, 2019

(54) FLARE-TYPE BRAKE LINE ASSEMBLY AND METHOD OF MAKING THE SAME

(71) Applicant: FORD GLOBAL TECHNOLOGIES, LLC, Dearborn, MI (US)

(72) Inventors: Janet Lynn Callahan, Troy, MI (US); Martin Christopher Kapanowski, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 792 days.

(21) Appl. No.: 15/000,457

(22) Filed: Jan. 19, 2016

(65) Prior Publication Data

US 2017/0203743 A1    Jul. 20, 2017

(51) Int. Cl.
*F16L 19/028* (2006.01)
*B60T 17/04* (2006.01)
*F16L 19/02* (2006.01)

(52) U.S. Cl.
CPC .......... *B60T 17/043* (2013.01); *F16L 19/028* (2013.01); *F16L 19/0286* (2013.01); *F16L 19/0243* (2013.01)

(58) Field of Classification Search
CPC .. F16L 19/0243; F16L 19/0283; B60T 17/043
See application file for complete search history.

(56) References Cited

U.S. PATENT DOCUMENTS

| | | | |
|---|---|---|---|
| 2,189,566 A * | 2/1940 | Kreidel | F16L 19/045 285/332.4 |
| 2,439,351 A | 4/1948 | Thayer et al. | |
| 3,139,294 A * | 6/1964 | Richards, Jr. | F16L 19/046 277/622 |
| 4,570,981 A * | 2/1986 | Fournier | F16L 19/0218 285/332.3 |
| 5,082,243 A * | 1/1992 | Berglund | F16L 19/0206 251/144 |
| 5,887,912 A | 3/1999 | Nakamura | |
| 6,357,801 B1 * | 3/2002 | Takahashi | F16L 19/0286 285/334.5 |
| 6,663,146 B1 | 12/2003 | Sakai et al. | |
| 7,390,033 B2 | 6/2008 | Weick et al. | |
| 7,690,695 B2 * | 4/2010 | Duquette | F16L 25/0036 285/249 |
| 8,152,204 B2 | 4/2012 | Pliassounov | |
| 8,172,278 B2 | 5/2012 | Abbott et al. | |

(Continued)

FOREIGN PATENT DOCUMENTS

| | | | |
|---|---|---|---|
| GB | 1430364 A * | 3/1976 | F16L 19/0283 |
| JP | 4442806 B2 | 3/2010 | |

OTHER PUBLICATIONS

English machine translation of JP4442806B2.

*Primary Examiner* — David Bochna
(74) *Attorney, Agent, or Firm* — Ray Coppiellie; King & Schickli, PLLC

(57) ABSTRACT

A flare-type brake line assembly includes (a) a brake tube having a flare with a first sealing surface, (b) a brake component having a port with a second sealing surface and (c) a tube nut to secure the brake tube and brake component together. At least one of the two sealing surfaces is treated to increase the coefficient of friction between those surfaces. A related method is also disclosed.

6 Claims, 1 Drawing Sheet

(56) References Cited

U.S. PATENT DOCUMENTS

| | | | |
|---|---|---|---|
| 2005/0087984 A1* | 4/2005 | Weick | F16L 19/0286 285/334.2 |
| 2007/0194567 A1 | 8/2007 | Pliassounov | |
| 2012/0049512 A1* | 3/2012 | Hayes, Jr. | F16L 19/0283 285/256 |
| 2012/0175873 A1* | 7/2012 | Kim | F16L 19/0286 285/386 |

* cited by examiner

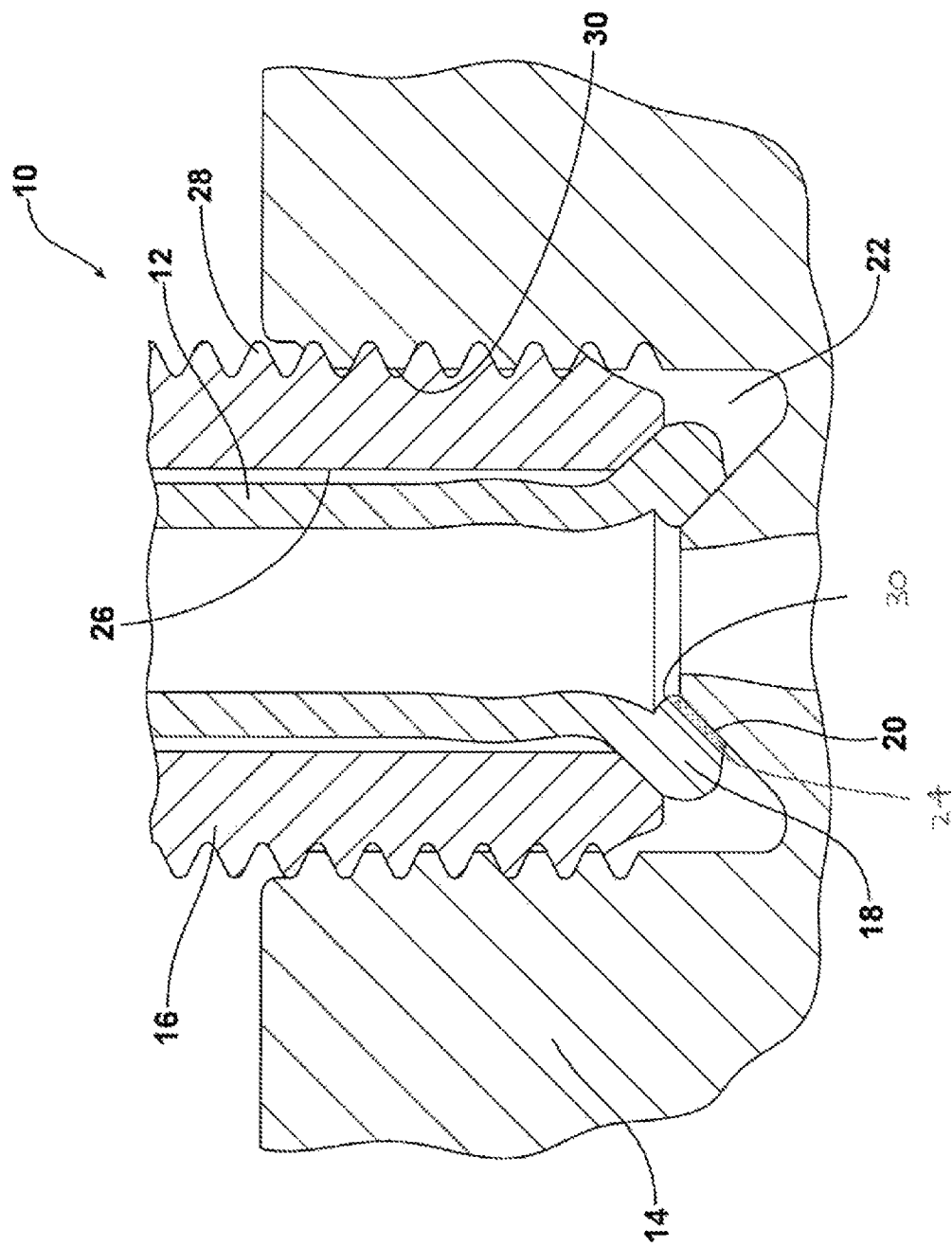

FLARE-TYPE BRAKE LINE ASSEMBLY AND METHOD OF MAKING THE SAME

TECHNICAL FIELD

This document relates generally to the motor vehicle equipment field and, more particularly, to a flare-type high-pressure hydraulic tube joint typically used in brake lines as well as to a method of making the same. The following discussion uses hydraulic brake joints as an example but the design improvements presented apply to any joint using a hollow, externally threaded nut to secure a flared tube to another component.

BACKGROUND

High pressure hydraulic brake tubes are generally connected to the brake components by using a tube nut with a hole along its axis of rotation and threads on its exterior. More specifically, the tube nut is positioned around the brake tube so that it threads into a port on the brake component and presses against the back of the flare formed on the end of the brake tube. Thus, the tube nut presses a first sealing surface on the flare of the brake tube into contact with a second sealing surface on the port of the brake component. The contact between the sealing surfaces is compressed by a force sufficient to create a metal-to-metal seal to keep high-pressure brake fluid in the brake system.

Historically, the two sealing surfaces have contained imperfections that are compressed during the tube nut torquing process, resulting in both a seal and a microscopic mechanical locking of the two surfaces. This locking effect was enough to resist the twisting tendency that the brake tube may adopt during the torquing process due to the rotation of the nut on the back side of the brake tube flare.

In recent years the sealing surface of the brake tube and the brake component have been made smoother in an effort to improve the initial sealing robustness of the joint in the vehicle assembly plants. The increased smoothness of the surfaces combined with the high contact area may result in a friction couple that does not generate enough resisting torque to prevent the brake tube from twisting with respect to the brake component during the torquing process. Should the brake tube twist during torquing, multiple unintended and undesirable consequences may result. For example, galling metal may occur at the sealing surfaces due to sliding by metal-on-metal under high contact forces. Further, the brake tube may store torsional energy which can contribute to lower loosening torques of the tube nut. In addition the segments of the brake tube may move out of design-intent positions resulting in lower than intended clearances to other vehicle components.

This document relates to a new and improved flare-type brake line assembly that addresses and eliminates this problem. A method of sealing a flare-type brake line assembly that addresses this problem is also disclosed.

SUMMARY

In accordance with the purposes and benefits described herein, a flare-type brake line assembly is provided. That flare-type brake line assembly comprises (a) a brake tube having a flare with a first sealing surface, (b) a brake component having a port with a second sealing surface, and (c) a tube nut securing the brake tube to the brake component. More specifically, the first sealing surface is sealed against the second sealing surface by the tube nut. The flare-type brake line assembly is characterized by at least one sealing surface of the first and second sealing surfaces being treated to provide a first coefficient of friction between the brake tube and the brake component that is greater than a second coefficient of friction between the tube nut and the brake tube. In this way twisting between the brake tube and the brake component is avoided during torquing of the tube nut.

In one possible embodiment, at least one sealing surface includes an applied coating, an applied paint, an applied adhesive, an applied glue, an applied epoxy or an applied other material providing an increased coefficient of friction between the first sealing surface and the second sealing surface.

In another possible embodiment at least one sealing surface is roughened for increased mechanical interference and coefficient of friction between the first sealing surface and the second sealing surface.

In accordance with an additional aspect, a method is provided for sealing a flare-type brake line assembly that includes (a) a brake tube having a flare with a first sealing surface, (b) a brake component having a port with a second sealing surface and (c) a tube nut for securing the brake tube to the brake component. The method may be broadly described as comprising a step of treating at least one sealing surface of the first sealing surface and the second sealing surface to provide a first coefficient of friction between the brake tube and the brake component that is greater than a second coefficient of friction between the tube nut and the brake tube. Further, the method may include the step of securing the brake tube to the brake component by tightening the tube nut in a threaded engagement with the brake component.

Still further, the method may include the step of applying to at least one sealing surface of the first sealing surface and the second sealing surface a material selected from a group of materials consisting of a coating, a paint, an adhesive, a glue, an epoxy or other material providing an increased coefficient of friction between the first sealing surface and the second sealing surface. In accordance with another embodiment the method includes the step of roughening at least one sealing surface of the first sealing surface and the second sealing surface to increase the first coefficient of friction above the second coefficient of friction. Advantageously, this is done while maintaining sufficient sealing robustness between the brake tube and the brake component to prevent high pressure brake fluid from leaking between the first sealing surface and the second sealing surface. Still further, the method may include roughening the at least one sealing surface by a process selected from a group consisting of acid etching, chemical etching, laser etching, knurling, sand blasting and combinations thereof.

In the following description, there are shown and described several preferred embodiments of the flare-type brake line assembly. As it should be realized, the flare-type brake line assembly is capable of other, different embodiments and its several details are capable of modification in various, obvious aspects all without departing from the flare-type brake line assembly as set forth and described in the following claims. Accordingly, the drawings and descriptions should be regarded as illustrative in nature and not as restrictive.

BRIEF DESCRIPTION OF THE DRAWING FIGURE

The accompanying drawing FIGURE incorporated herein and forming a part of the specification, illustrates several aspects of the flare-type brake line assembly and together with the description serves to explain certain principles thereof. In the drawing FIGURE:

FIG. 1 is a cross-sectional view of a flare-type brake line assembly illustrating the brake tube, having a flare with a first sealing surface, the brake component, having a port with a second sealing surface, and the tube nut securing the brake tube to the brake component with the first sealing surface sealing against the second sealing surface.

Reference will now be made in detail to the present preferred embodiments of the flare-type brake line assembly and the method for making the assembly, examples of which are illustrated in the accompanying drawing FIGURE.

DETAILED DESCRIPTION

Reference is now made to FIG. 1 illustrating the flare-type brake line assembly 10. That assembly 10 includes a brake tube 12, a brake component 14 and a tube nut 16. More specifically, the brake tube 12 includes a flare 18 with a first sealing surface 20. The brake tube 12 may be made from any appropriate metal material known in the art to be useful for this purpose. The brake component 14 includes a port 22 with a second sealing surface 24. The brake component 14 may also be made from any appropriate metal material known to be useful for this purpose. The tube nut 16 includes an axial opening 26 and a threaded exterior wall 28. As should be appreciated, the tube nut 16 secures the brake tube 12 to the brake component 14.

More specifically, the tube nut 16 is positioned over the brake tube 12, so that the brake tube extends through the axial opening 26. The brake tube 12 is then aligned with the brake component 14 so that the first sealing surface 20 on the brake tube meets the second sealing surface 24 on the brake component. The threaded exterior wall 28 of the tube nut 16 is then brought into engagement with the threaded wall 30 of the port 22 and tightened.

As the tube nut 16 is tightened down with the necessary torque to provide proper sealing between the first sealing surface 20 and the second sealing surface 24 to maintain high pressure brake fluid in the brake system, the contact between the tube nut 16 and the flare 18 opposite the first sealing surface 20 has a tendency to cause the brake tube 12 to twist relative to the brake component 14 along the sealing surfaces 20, 24.

Should twisting occur, a number of possible adverse effects may result including, but not necessarily limited to the galling of the metal sealing surfaces 20, 24 due to the sliding of metal-on-metal under the high contact forces produced during the torquing process. Further, the brake tube 12 may store the torsional energy and this might later contributed to lower torques required to loosen the tube nut 16. Further, segments of the brake tube 12 may move out of design intent position resulting in lower than intended clearances for other components.

In order to avoid these potential problems, the flare-type brake line assembly 10 is characterized by at least one of the sealing surfaces 20, 24 being treated to provide a first coefficient of friction between the brake tube 12 and the brake component 14 that is greater than a second coefficient of friction that is provided between the tube nut 16 and the brake tube 12 during the torquing process.

In one possible embodiment, the first sealing surface 20 and/or the second sealing surface 24 includes an applied material 30 that is engineered to provide the desired increased coefficient of friction between the first sealing surface and the second sealing surface. That applied material may be selected from a group of materials consisting of a coating, a paint, an adhesive, a glue, an epoxy or other appropriate material. Thus, for example, the first sealing surface 20 and/or the second sealing surface 24 may be (a) coated with a wax, (b) anodized, (c) painted with a torque and tension fluid or (d) coated with Loctite® adhesive.

Here it should be appreciated that the applied material may also include mixtures of coatings, paints, adhesives, glues, epoxies or other appropriate materials as well as individual layers of such materials.

In another possible embodiment, the first sealing surface 20 and/or the second sealing surface 24 is roughed for increased mechanical interference and coefficient of friction between the first sealing surface and the second sealing surface. Here it should be appreciated that this is an engineered roughing adapted to prevent any twisting of a brake tube 12 with respect to the brake component 14 during the torquing of the tube nut 16 and the assembly of the flare-type brake line assembly 10 while simultaneously allowing for robust sealing between the sealing surfaces necessary to prevent any leaking of high pressure brake fluid between the first and second sealing surfaces 20, 24.

Consistent with the above description, a twist prevention method is provided for a flare-type brake line assembly 10 including (a) a brake tube 12 having a flare 18 and a first sealing surface 20, (b) a brake component 14 having a port 22 with a second sealing surface 24 and (c) a tube nut 16.

That method may be broadly described as including the step of treating at least one sealing surface 20, 24 to provide a first coefficient of friction between the brake tube 12 and the brake component 14 that is greater than a second coefficient of friction between the tube nut 16 and the brake tube 12. Further, the method may include the step of securing the brake tube 12 to the brake component 14 by tightening the tube nut 16 in threaded engagement with the brake component 14.

As noted above, the method may also include applying to the first sealing surface and/or the second sealing surface a material selected from a group of materials consisting of a coating, a paint, an adhesive, a glue, an epoxy or other material providing an increased coefficient of friction between the first sealing surface and the second sealing surface.

In another possible embodiment, the method may include the engineered roughing of at least the first sealing surface 20 and/or the second sealing surface 24 to increase the first coefficient of friction above the second coefficient of friction while maintaining sufficient sealing robustness between the brake tube 12 and the brake component 14 to prevent high pressure brake fluid from leaking between the two sealing surfaces.

Such an engineered roughing of the first sealing surface 20 and/or the second sealing surface 24 may be completed by a process selected from a group consisting of acid etching, chemical etching, laser etching, knurling, sand blasting and combinations thereof.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of sealing a flare-type brake line assembly including (a) a brake tube having a flare with a first sealing surface, (b) a brake component having a port with a second sealing surface and (c) a tube nut, comprising:

treating at least one sealing surface of said first sealing surface and said second sealing surface to provide a first coefficient of friction between said brake tube and said brake component greater than a second coefficient of friction between said tube nut and said brake tube by (a) applying a material selected from a group of materials consisting of a paint, an adhesive, or a glue, to said at least one sealing surface or (b) roughening at least one sealing surface of said first sealing surface and said second sealing surface to increase said first coefficient of friction above said second coefficient of friction while maintaining sufficient sealing robustness between said brake tube and said brake component to prevent high pressure brake fluid from leaking between said first sealing surface and said second sealing surface when the first sealing surface is against the second sealing surface.

2. The method of claim 1 further including securing said brake tube to said brake component by tightening said tube nut in threaded engagement with said brake component.

3. The method of claim 1 including applying a paint to at least one sealing surface of said first sealing surface and said second sealing surface in order to increase said coefficient of friction between said first sealing surface and said second sealing surface.

4. The method of claim 1 including applying an adhesive to at least one sealing surface of said first sealing surface and said second sealing surface in order to increase said coefficient of friction between said first sealing surface and said second sealing surface.

5. The method of claim 1 including applying a glue to at least one sealing surface of said first sealing surface and said second sealing surface in order to increase said coefficient of friction between said first sealing surface and said second sealing surface.

6. The method of claim 1, further including roughening said at least one sealing surface by a process selected from a group consisting of said acid etching, chemical etching, laser etching, knurling, sand blasting, and combinations thereof.

* * * * *